July 4, 1967  T. M. BEAR  3,329,093
APPARATUS FOR MAINTAINING A WORKING FLEXING CUSHION
Filed April 14, 1965  2 Sheets-Sheet 2
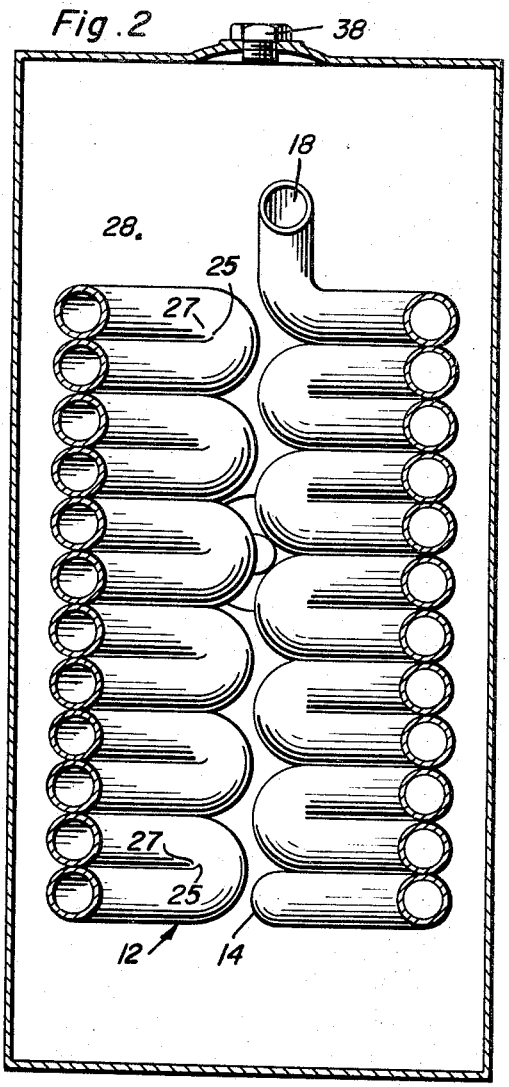
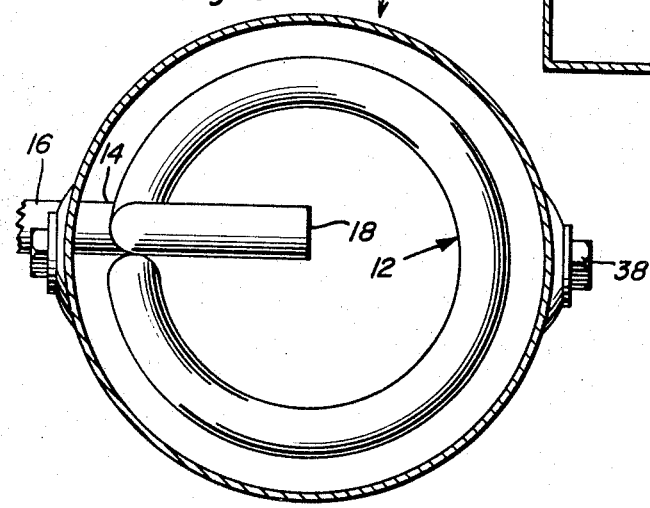
Thomas M. Bear
INVENTOR.

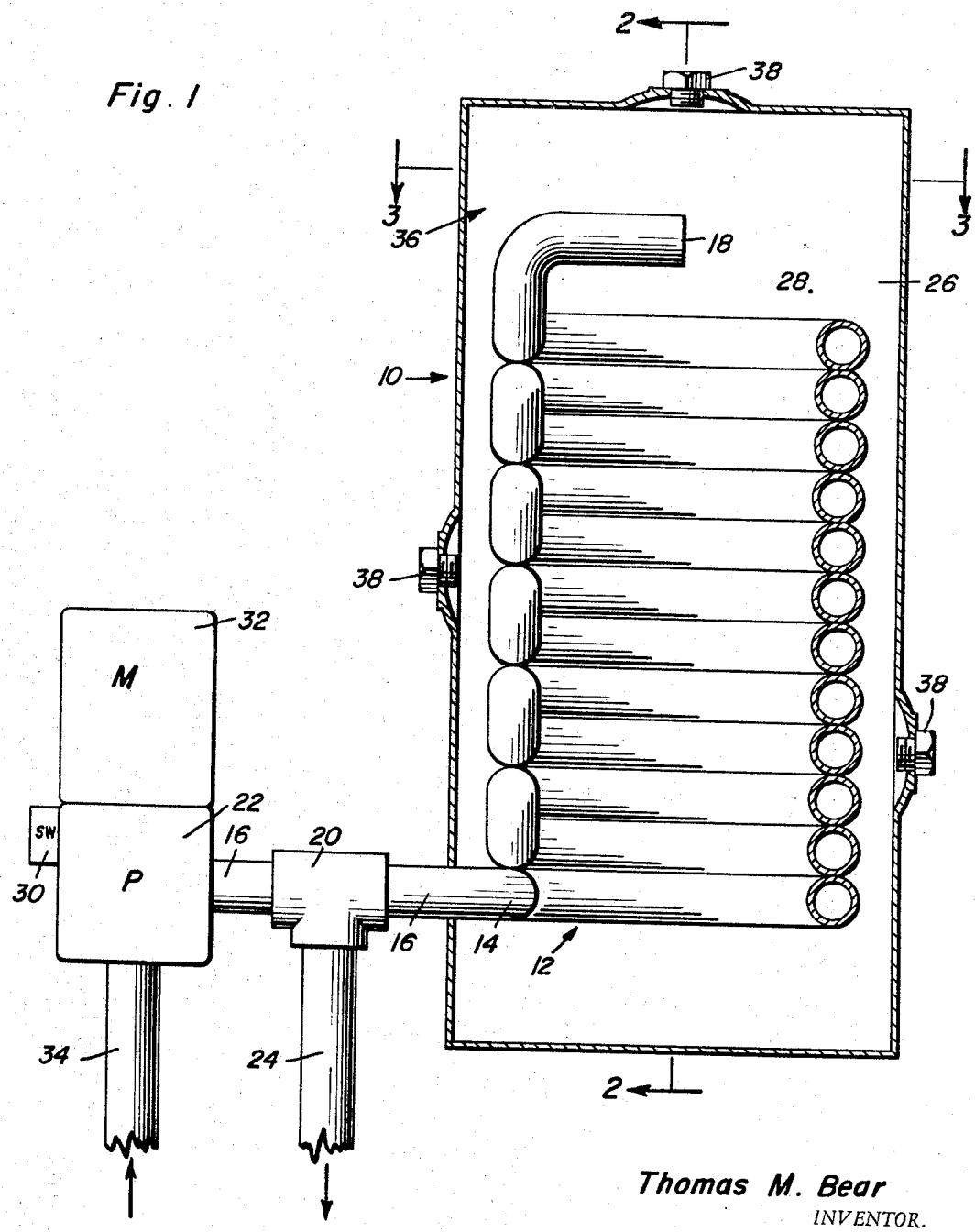

3,329,093
APPARATUS FOR MAINTAINING A WORKING FLEXING CUSHION
Thomas M. Bear, 3002 Kentucky St., Joplin, Mo. 64801
Filed Apr. 14, 1965, Ser. No. 448,149
9 Claims. (Cl. 103—6)

This invention comprises a novel and useful apparatus for maintaining a working flexible cushion and more particularly pertains to a means for pressurizing a liquid in a closed tank for pressure distribution of liquid therefrom by compressing gas accumulation above the level of the liquid in the closed tank through the replenishing of the liquid supply to compensate for liquid withdrawn from the device.

Conventional private home and commercial pressure water systems, utilizing an unaerated well as a water source, automatically operate to maintain water under a fluctuating cushion of compressed air between predetermined pressure limits. Usually, for household use, the water is charged in a tank sealed from the atmosphere in order to compress the air therein at pressure between about 20 to 40 pounds per square inch. As the service line withdraws water from the tank, the compressed air therein applies pressure to feed the water to the service line. When this pressure drops to the lower limit at which the automatic controls are set, an electric pump is started which again charges the pressure tank with water until the rising liquid level therein reduces the air volume and increases its pressure to the predetermined upper limit as for example 40 pounds per square inch, at which time the pressure control discontinues operation of the pump.

It is desirable in such systems whether of commercial use with higher pressure ranges or of domestic use within the moderate pressure ranges of about 20 to 40 pounds per square inch, that the water level of the tank shall be maintained at substantially constant level for a given pressure. However, it is well known that when unaerated water from a well or the like is charged into the tank, the water tends to absorb some of the air from the air cushion thereabove thereby depleting the volume of air. Conquently, when this condition occurs, the water level tends to rise higher and higher and therefore there is less volume of the cushioning medium or pressure producing medium in the tank. When the volume of the air cushion drops to a sufficiently low limit, it is evident that the same demand for water from the system will cause the pump to function at increasingly frequent intervals finally resulting in damage to the pump or the motor comprising the same. Further, the automatic pressure control switch associated with the pump may be damaged under this condition.

It is therefore the primary object of this invention to overcome the aforementioned disadvantages by providing a water pressure system in which a substantially constant water level is maintained for a given cushion pressure by the elimination of the loss of air through absorption by the water. This is effected in three ways: by employing a gas which is relatively insoluble in water; by reducing the surface contact area between the gas and the water; and by employing a special expanding gaseous medium.

A further object of the present invention is to provide apparatus for maintaining a flexible pressure cushion which is simple in principle, low in cost and relatively maintenance free and safe in operation.

A still further object of the present invention is to provide apparatus for maintaining a flexible pressure cushion which reduces the number of working parts (for example, floats, levers, valves, air charging devices, air volume controls, and fittings) while at the same time providing an increased water storage capability and extended time interval between pump operations.

Another object of the present invention is to provide a novel conduit for water storage which operates confluently with a gaseous medium to provide a pressure-flow water system.

Another object of the present invention is to provide a specially formed conduit for water storage which operates confluently with a liquefiable gaseous medium having traps therein to retain the liquefied medium in the conduit.

These together with other objects and advantages which will become subsequently apparent reside in the details of construction and operation as more fully hereinafter described and claimed reference being had to the accompanying drawings forming a part hereof, wherein like numerals refer to like parts throughout, and in which:

FIGURE 1 is a diagrammatic view, partly in elevation and partly in vertical section through a conventional type of household water pressure system incorporating therein the principle of this invention and employing a relatively insoluble gas as the pressurizing medium within the pressure tank system;

FIGURE 2 is a vertical sectional view taken substantially along the plane of the line 2—2 of FIGURE 1;

FIGURE 3 is a horizontal sectional view taken substantially along the plane of the line 3—3 of FIGURE 1;

FIGURE 4 is an enlarged partial cross-sectional view of a conduit comprising an alternative embodiment of the present invention.

Referring now more particularly to the drawings the system includes a pressure tank 10 of any suitable construction having therein a conduit 12 for receiving, carrying and storing water under pressure. Conduit 12 is supported in the pressure tank 10 and defines a serpentine shape which is folded to form a cylinder. Conduit 12 includes a first end 14 which communicates with a water source line 16 extending outwardly of said pressure tank 10. Conduit 12 extends upwardly in a serpentine manner in said pressure tank 10 and terminates in an open end 18 near the top of said tank. Water source line 16 extends into T-joint 20 and out the other end to a conventional pump 22. The third outlet of the T-joint 20 leads to a water outlet passage 24.

An inside wall of the conduit, indicated at 25 is deformed to form a lip or trap 27 which operates as explained below.

Pressure tank 10 defines a compartment 26 which in conjunction with the open end 18 of the conduit 12 constitutes an expansible gas chamber 28.

An adjustable water pressure responsive control switch 30 is mounted adjacent the pump 22 and is responsive to the pressure of the water carried by water source line 16 for the control and operation of a conventional motor 32 which is the driving force for the pump 22.

In accordance with conventional practice, an automatic water pressure system includes a means for supplying water under pressure to a pressure tank to replace water delivered therefrom. This water supply means may conveniently comprise any suitable form of pump, such as the pump indicated by numeral 22 which may be operated as by a conventional electrical motor indicated at 32 through a suitable electrical circuit, not shown, under the control of a pressure-responsive switch 30. The pump 22 is connected to any suitable source of water such as a well by a water supply conduit 34, which is usually of an unaerated type.

In conventional systems air is generally employed as the pressure medium. This raises a problem in that air is soluble in the water thereby gradually depleting the quantity of air in the expansion chamber. As a result, the expansion chamber gradually decreases in volume and due to the decrease in volume the automatic pressure-responsive switch tends to actuate the motor at more and more frequent intervals thereby imposing an undue wear on the motor. Attempts to overcome this difficulty has heretofore consisted in complicated means for attempting to replenish the air supply to restore the absorbed volume of air. This requires complicated apparatus and is generally unsatisfactory.

In accordance with the present invention the problem is solved by the use of a gaseous medium which is relatively insoluble in water so that when the tank is once charged with the proper quantity of gas, recharging is seldom required due to the operation of the automatic water supply system. Examples of such gases which are relatively insoluble in water and which are satisfactory for the purposes of this invention include dichlorodifluoromethane and chlorotrifluoromethane, commonly referred to as Freon 12 and Freon 13. It is anticipated that the Freon 12 and the Freon 13 will be used as a gaseous mixture 36 to provide the flexible air cushion maintained in expansible gas chamber 28. The gaseous Freon 12 and Freon 13 are listed as being insoluble for example in the "Handbook of Chemistry and Physics," Chemical Rubber Publishing Company, page 910. As is well known to those skilled in the art, Freon 12 is liquefiable at a relatively low atmospheric pressure at normal operating conditions and temperature, and the Freon 13 is liquefiable only at a relatively higher atmospheric pressure. The use of Freon 12 and Freon 13 is further advantageous as these gases are non-toxic and non-flammable, thereby providing important safety in operation.

An important feature of this invention is that the only contact between the gaseous mixture 36 and the water contained in the serpentine conduit 12 is in a surface area defined by the cross-sectional area of the conduit 12. Normally, the conduit will be relatively small in diameter, for example the diameter will probably be in the range of one to two inches. It may be appreciated therefore that the contact area between the water and the gaseous mixture will be approximately three to thirteen square inches. In a conventional water pressure supply system the contact area between the gas and water will normally be somewhat over 300 square inches. Thus, it is obvious that adsorption and absorption which will take place will be radically diminished.

A further safety feature is that upon reaching the rupture point of the tank the Freon 12 is completely liquefied and hence less explosive.

The operation of this form of the invention is described as follows. The tank 10 is exhausted of air and the gaseous mixture of Freon and nitrogen is introduced into the chamber. It is apparent that the gaseous mixture will also enter the conduit 12 at the end 18. The pump 22 is then activated and water is pumped into the conduit 12 thereby compressing the gaseous mixture 36 by reducing the total volume of the chamber 28. The water is raised by the pump 22 to a predetermined height in the conduit 12 until the pressure in the column of water equals the upper limit of the pressure switch 30. Prior to reaching the upper limit of the pressure switch 30, the Freon 12 portion of the gaseous mixture will be liquified and will thereby be reduced in volume thereby allowing the pressure to remain constant until all of the Freon 12 is liquefied. This obviously allows more water to be stored in the conduit 12. After the Freon 12 is in a liquid state, the Freon 13 continues to be compressed to the predetermined upper pressure limit at which time the pressure switch 30 deactivates pump 22. Upon opening outlet 24, water under pressure flows from the conduit at end 14 through the T-joint 20 and out outlet 24. The water is maintained at constant pressure while the liquefied Freon 12 returns to a gaseous condition, then at a decreasing pressure as the water flows from the conduit thereby expanding the volume of chamber 28 and decreasing the pressure of gaseous mixture 36. The liquefied Freon 12 is denser than and immiscible in the water and hence has a tendency to settle towards the bottom of conduit 12. To prevent this the traps 27 are provided. Traps 27 operate to retain the liquefied Freon 12 in the conduit 12 by trapping it therein, thereby preventing it from traversing downwardly in the conduit and eventually running out the water line 16. When the pressure in the water is reduced to the lower limit of the pressure switch 30 the pressure switch 30 activates the motor 32 and pump 22 thereby causing water to flow through line 16 and the conduit is filled. This describes one complete cycle of operation.

The gaseous mixture may be introduced into the tank 10 at any of the gas charging openings 38 in tank 10.

FIGURE 4 illustrates an alternative embodiment of the present invention. In this embodiment it is contemplated that the pressure tank 10 will no longer be needed. Instead, the conduit 12, supported in any conventional manner, can be closed at the upper end 18 by cover 40 after a predetermined amount of gaseous mixture is introduced into the conduit 12. The upper part of the conduit designated at 42 will constitute an expansion chamber 43 operable similarly to expansion chamber 28 as explained above. The operation of this embodiment of the invention is similar to that described above.

It is apparent from the foregoing discussion that the improvement over the prior art encompassed by this invention lies in the reduction of surface contact area between the compressible gas and the water being pumped, as well as the use of relatively insoluble gases thereby minimizing the amount of adsorption and absorption therebetween. This allows the volume of the expansible chamber to remain relatively constant. Further, the use of a gas which is liquefiable at a pressure within an operating pressure range of the present invention allows an additional amount of water to be stored and supplied by the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water pressure supply system comprising a conduit for receiving water through a water source line at a first end from a water delivery line, a pressurizing gas mixture including at least one relatively water-insoluble gas introduced in the other end of the conduit and in communication with said water for applying pressure to said water, one gas of said gas mixture remaining gaseous at the operating pressure of the system, another gas of said gas mixture changing between a gaseous and liquid state at the operating pressure of the system for the purpose of maintaining a relatively constant pressure on the water, the first end of said conduit in communication with a water outlet passage for supplying water under pressure to said outlet passage, an adjustable water pressure responsive control switch means operatively connected to said water source line and responsive to determine minimum and maximum pressure in said water source line for respectively energizing and deenergizing said delivery means whereby a water level in said conduit is maintained between fixed upper and lower limits.

2. The system of claim 1 wherein said conduit including trap means for retaining said liquefiable gas therein when said gas is in a liquefied condition, said water pressure being maintained constant when said liquefiable gas is changing from gaseous to liquid or liquid to gaseous form.

3. A water pressure supply system comprising a pressure tank having a coil conduit supported therein, said conduit in communication with a water source line and a water outlet passage at a first end, said conduit in communication with the interior of said pressure tank at the other end, said water source line positioned to receive water from a water delivery means for delivery to said conduit, a relatively water-insoluble gas mixture introduced in the pressure tank and in the other end of the conduit, one gas of said gas mixture remaining gaseous at the operating pressure of the system, another gas of said gas mixture changing between a gaseous and a liquid state at the operating pressure of the system for the purpose of maintaining a relatively constant pressure on the water, said gas mixture in communication with said water carried by said conduit for applying pressure to said water, a water pressure responsive control means operatively connected to said water source line and said delivery means and responsive to determine minimum and maximum pressure in said water source line for respectively energizing and deenergizing said delivery means whereby the water level in said conduit is maintained between fixed upper and lower limits.

4. The system of claim 3 wherein said conduit including trap means for retaining said first gas therein when said first gas is in a liquefied condition.

5. The system of claim 4 wherein said control means comprises an adjustable pressure control switch and said delivery means comprises a pump and motor adapted to be energized by said control switch.

6. A water pressure supply system comprising a coil conduit closed at a first end, said conduit in communication with a water source line and a water outlet passage at the other end, said water source line positioned to receive water from a water delivery means for delivery to said conduit, a pressurizing gas mixture introduced in the conduit adjacent said closed end, said gas mixture in communication with the water carried by said conduit for applying pressure to said water, one gas of said gas mixture remaining gaseous at the operating pressure of the system, another gas of said gas mixture changing between a gaseous and a liquid state at the operating pressure of the system for the purpose of maintaining a relatively constant pressure on the water, a water pressure responsive control means operatively connected to said water source line and said delivery means and responsive to determine minimum and maximum pressures in said water source line for respectively energizing and deenergizing said delivery means whereby the water level in said conduit is maintained between fixed upper and lower limits.

7. The system of claim 6 wherein said gas mixture is non-toxic and nonflammable in nature.

8. The system of claim 7 wherein said control means comprises an adjustable pressure control switch and said delivery means comprises a pump and motor adapted to be energized by said control switch.

9. A water pressure supply system comprising a water container for receiving water through a water source line, a relatively water-insoluble gas mixture introduced in the container and in communication with said water for applying pressure to said water, a water outlet passage extending from said container for supplying water under pressure through said passage, an adjustable water pressure responsive control switch means operatively connected to said water source line and responsive to determine minimum and maximum pressure in said line whereby a water delivery means is respectively energized and deenergized to maintain the water level in said container between fixed upper and lower limits, said gas mixture including a first gas which is liquefiable at a pressure within the response range of said control means and a second gas which is non-liquefiable at a pressure within the response range of said control means.

References Cited

UNITED STATES PATENTS

| | | | |
|---|---|---|---|
| 1,622,843 | 3/1927 | Price et al. | 138—26 |
| 1,927,752 | 9/1933 | Pardee et al. | 103—223 |
| 3,021,788 | 2/1964 | Kaatz | 103—55 |

DONLEY J. STOCKING, *Primary Examiner.*

W. L. FREEH, *Assistant Examiner.*